United States Patent [19]
Miller et al.

[11] Patent Number: 6,109,566
[45] Date of Patent: Aug. 29, 2000

[54] VIBRATION-DRIVEN ACOUSTIC JET CONTROLLING BOUNDARY LAYER SEPARATION

[75] Inventors: Robin Mihekun Miller, Ellington; Roman N. Tunkel, East Hartford, both of Conn.

[73] Assignee: United Technologies Corporation, Hartford, Conn.

[21] Appl. No.: 09/257,564

[22] Filed: Feb. 25, 1999

[51] Int. Cl.$^7$ .................................................. B64C 21/04
[52] U.S. Cl. .......................... 244/207; 244/130; 244/204
[58] Field of Search ............................... 239/4; 244/198, 244/199, 200, 204, 130, 206, 207, 210, 211, 212, 209, 208, 1 N

[56] References Cited

U.S. PATENT DOCUMENTS

| | | | |
|---|---|---|---|
| 3,467,043 | 9/1969 | Bowles | 244/204 |
| 3,774,867 | 11/1973 | Quinn | 244/130 |
| 3,974,986 | 8/1976 | Johnstone | 244/130 |
| 4,216,924 | 8/1980 | Fradenburgh | 244/207 |
| 4,285,482 | 8/1981 | Lewis | 244/207 |
| 4,516,747 | 5/1985 | Lurz | 244/204 |
| 4,749,151 | 6/1988 | Ball et al. | 244/207 |
| 4,802,642 | 2/1989 | Mangiarotty | 244/204 |
| 4,932,610 | 6/1990 | Maestrello | 244/204 |
| 5,016,837 | 5/1991 | Willis | 244/207 |
| 5,069,397 | 12/1991 | Haslund | 244/207 |
| 5,209,438 | 5/1993 | Wygnanski | 244/203 |
| 5,297,765 | 3/1994 | Hughes et al. | 244/209 |
| 5,758,823 | 6/1998 | Glezer et al. | 239/4 |
| 5,938,404 | 8/1999 | Domzalski et al. | 244/204 |
| 5,957,413 | 9/1999 | Glezer et al. | 244/208 |

OTHER PUBLICATIONS

Rediniotis, O. K., Ko, J., Yue, X. & Kurdila, A. J., "Synthetic Jets, Their Reduced Order Modeling and Applications to Flow Control", AIAA Paper No. 99–1000, 37th Aerospace Sciences Meeting& Exhibit, Reno, NV, Jan. 12–15, 1999.

Wygnanski, I., & Seifert, A., "The Control of Separation by Periodic Oscillations", 18th AIAA Aerospace Ground Testing Conference, Colorado Springs, CO, Jun. 20–23, 1994.

Amitay, M., Smith, B.L., & Glezer, A., "Aerodynamic Flow Control Using Synthetic Jet Technology", AIAA Paper No. 98–0208, 36th Aerospace Sciences Meeting & Exhibit, Reno, NV, Jan. 12–15, 1998.

Smith, D., Amitay, M., Kibens, V., Parekh, D., & Glezer, A., "Modifications of Lifting Body Aerodynamics Using Synthetic Jet Actuators", AIAA Paper No. 98–0209, 36th Aerospace Sciences Meeting & Exhibit, Reno, NV, Jan. 12–15, 1998.

Seifert, A. & Pack, L.G., "Oscillatory Control of Separation at High Reynolds Numbers", AIAA Paper No. 98–0214, 36th Aerospace Sciences Meeting & Exhibit, Reno, NV, Jan. 12–15, 1998.

Rediniotis, O.K., Ko, J., Yue, X. & Kurdila, A.J., "Synthetic Jets, Their Reduced Order Modeling and Applications to Flow Control", AIAA Paper No. 99–1000, 37th Aerospace Sciences Meeting & Exhibit, Reno, NV, Jan. 12–15, 1999.

*Primary Examiner*—Peter M. Poon
*Assistant Examiner*—Tien Dinh

[57] ABSTRACT

An acoustic jet disposed within an aerodynamic surface, such as a wing or a blade, has a resilient wall supporting a mass. Vibrations of the blade cause oscillatory pressure waves within the acoustic jet, the nozzle of which directs fluid particles having high momentum flux essentially tangentially into the boundary layer of the suction surface of the blade, the resonant cavity of the synthetic jet being replenished with particles having low momentum flux drawn from the flow in a direction normal to the surface, thereby to provide a net time averaged flow of fluid particles of increasing momentum flux into the boundary layer to defer or prevent the onset of boundary layer separation. Single and double chambers drive nozzles separated streamwise or spanwise on airfoils (blades, wings) and fuselages. Applications include helicopters, airplanes, air moving machines and wind energy electric power generators.

37 Claims, 7 Drawing Sheets

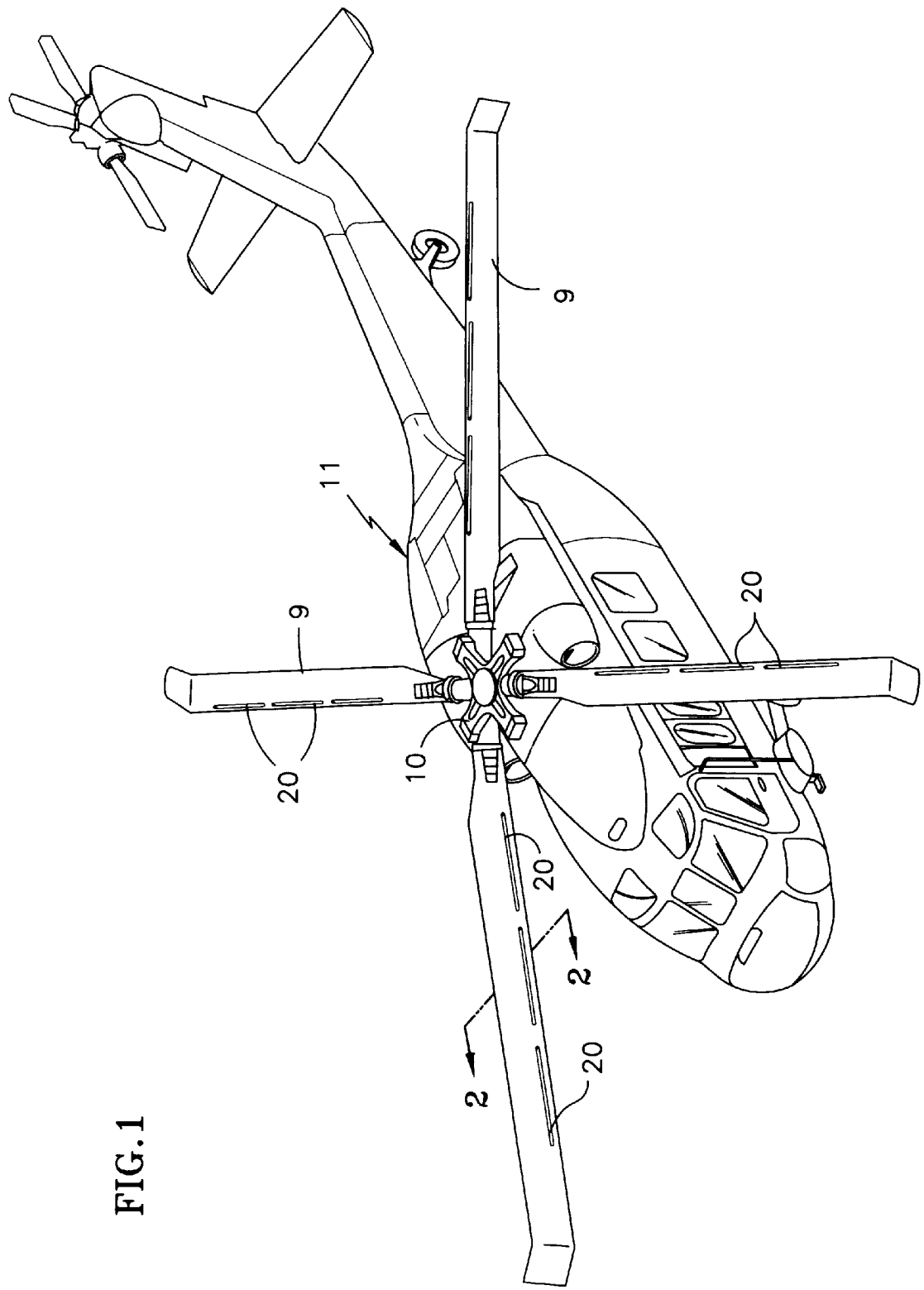

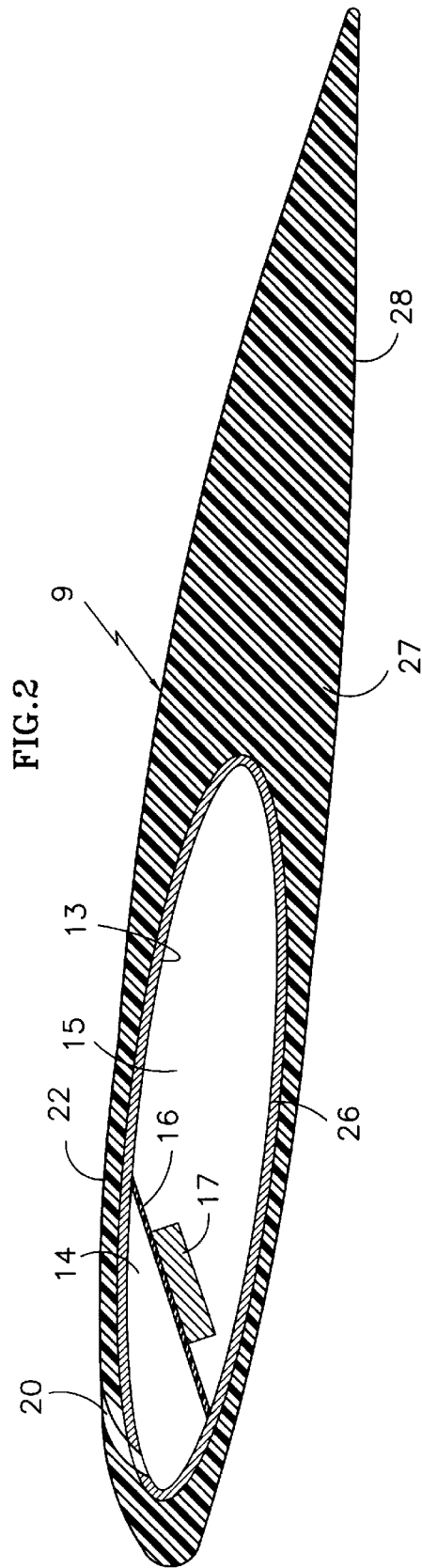
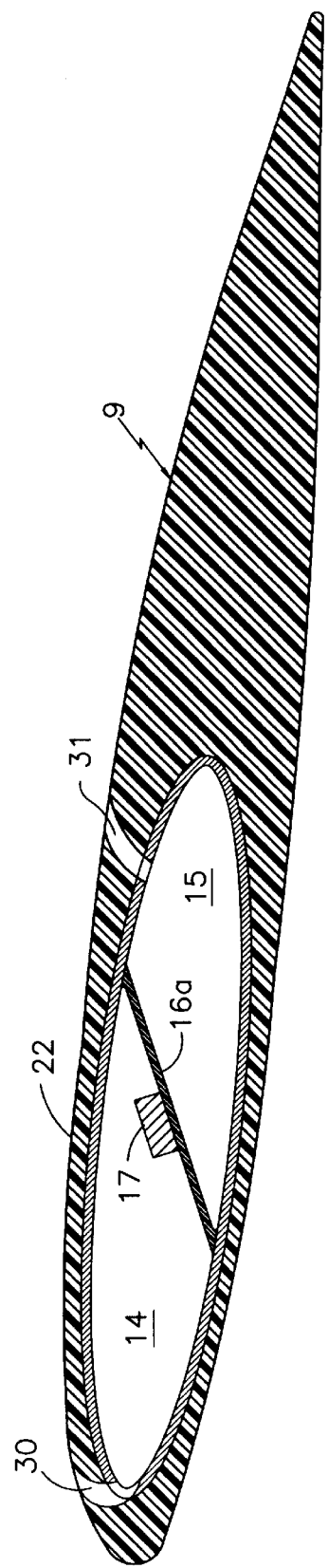

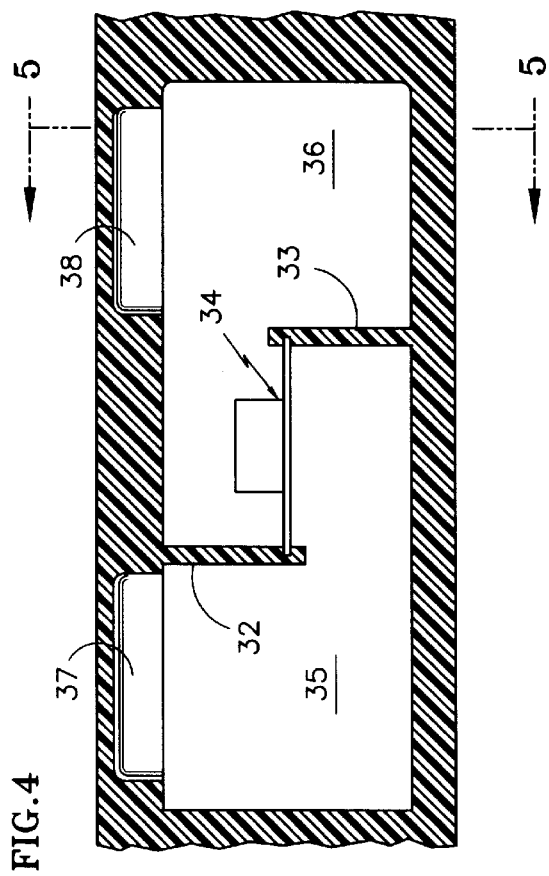
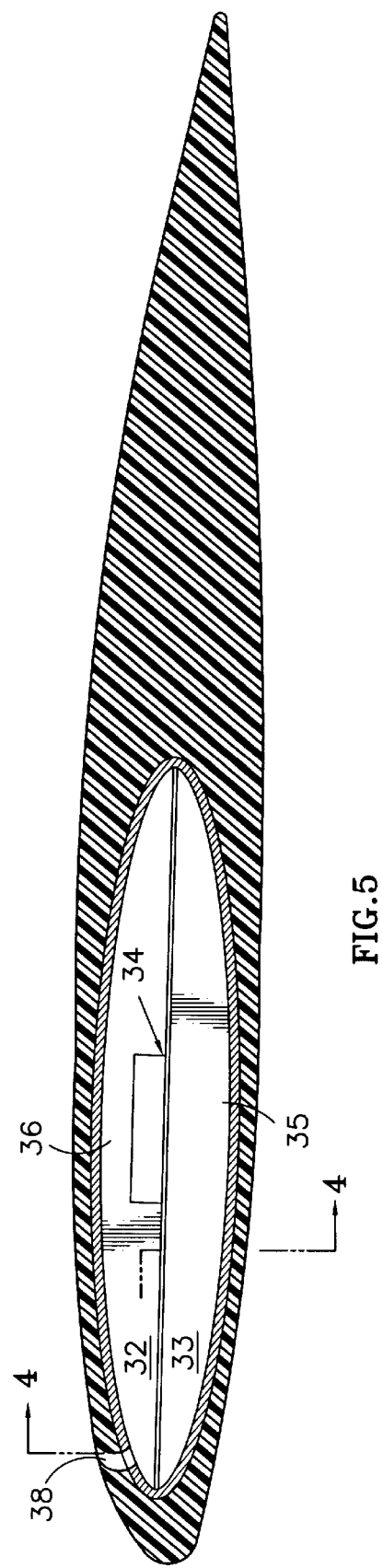
FIG.4
FIG.5

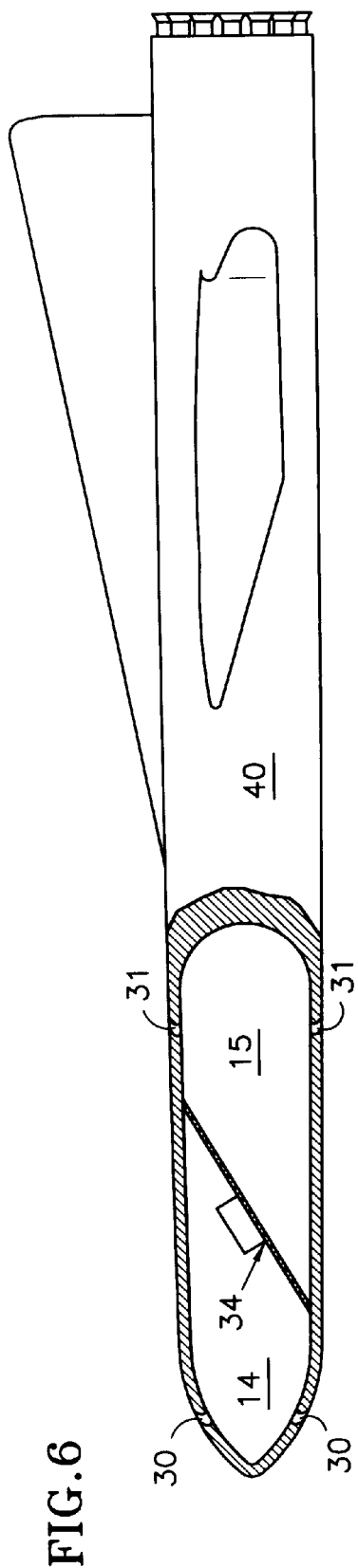
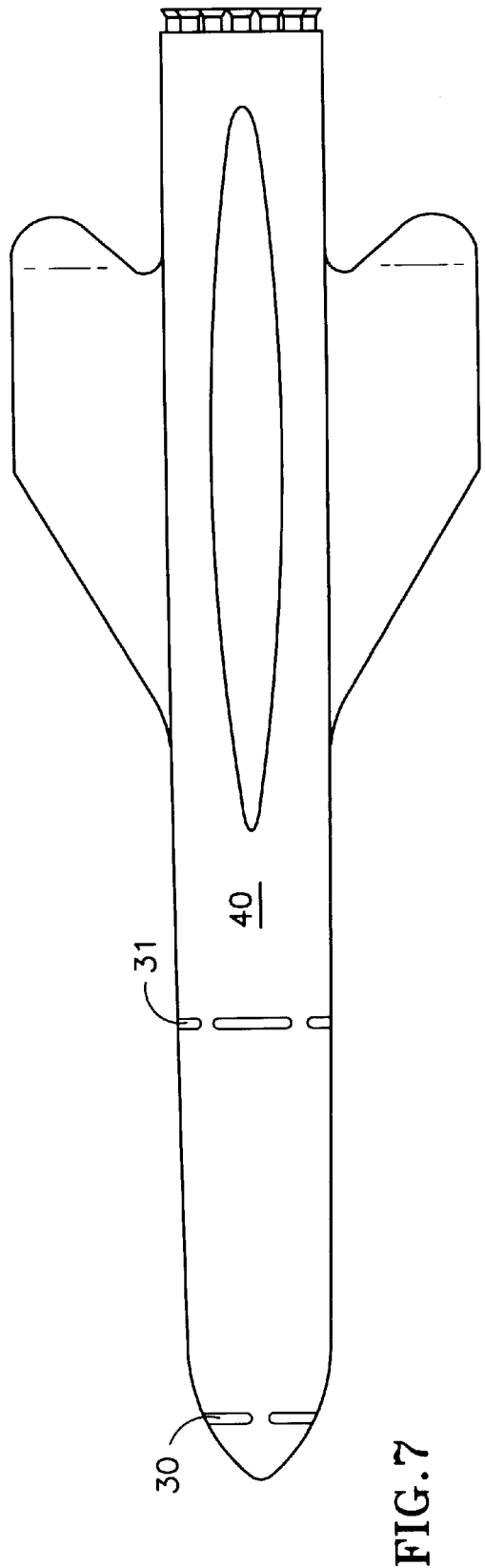

FIG.9
FIG.11
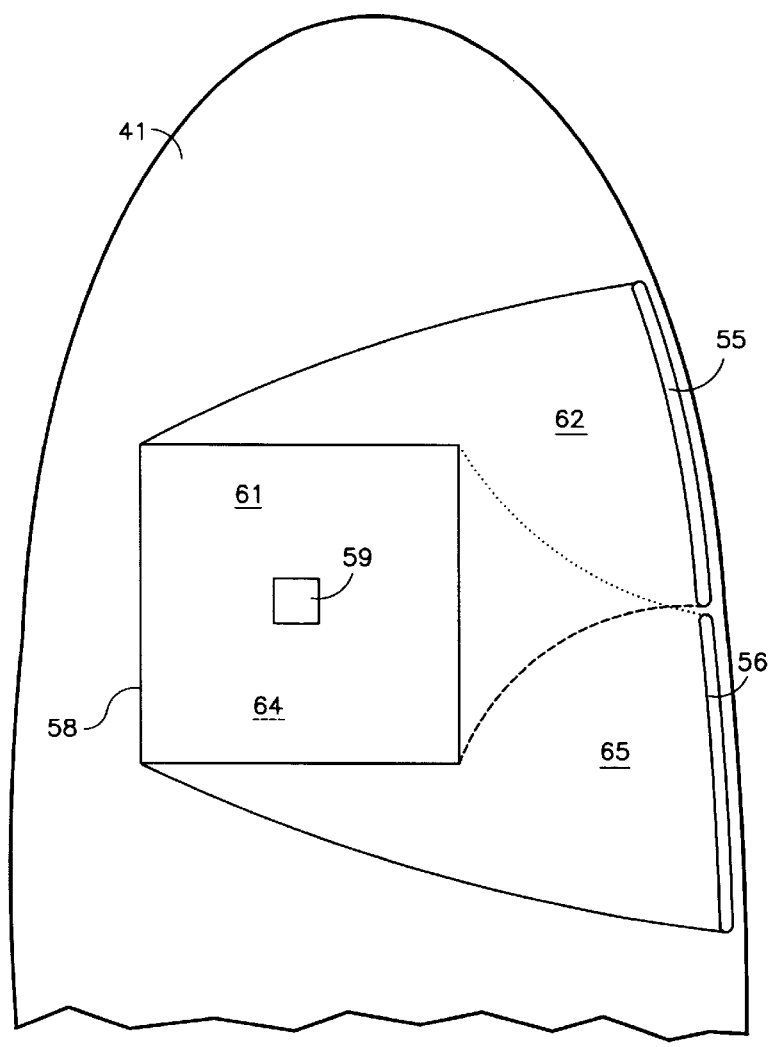
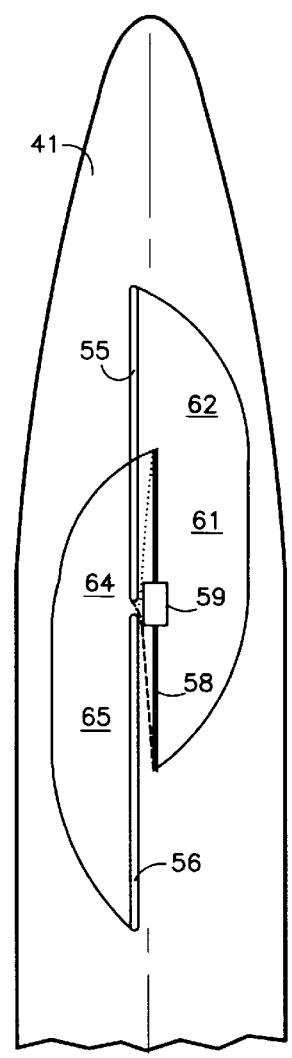
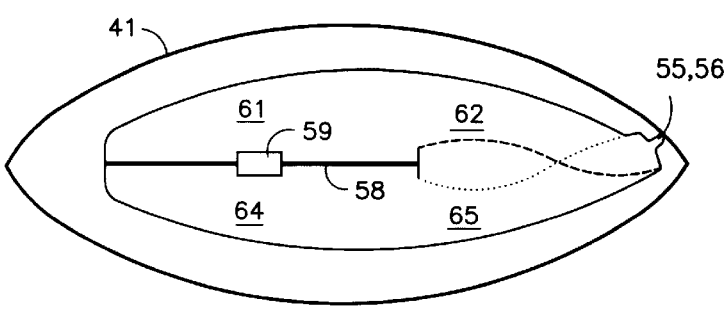
FIG.10

VIBRATION-DRIVEN ACOUSTIC JET CONTROLLING BOUNDARY LAYER SEPARATION

CROSS REFERENCE TO RELATED APPLICATIONS

Commonly owned copending U.S. patent applications filed contemporaneously herewith, Ser. Nos. 09/257,565, 09/257,563 and 09/257,483, contain subject matter related to that disclosed and claimed herein.

TECHNICAL FIELD

This invention relates to use of the vibration of a structure having a surface with an aerodynamic profile to drive an acoustic jet having a nozzle directed, preferably essentially tangentially, into the boundary layer of the surface to control boundary layer separation.

BACKGROUND ART

Boundary layer separation is a fundamentally limiting mechanism which constrains the design of fluid flow systems. As an example, it is known in the helicopter art that retreating blade stall establishes limits on rotor load and flight speed. In addition to the loss of capability to generate lift, unsteady blade stall transmits very large impulsive blade pitching moments to the flight control system. In order to prevent excess control loads, stall boundaries are set as a function of rotor load and flight speed. Stall boundaries define the maximum blade loads, which impact maneuverability and agility as well as speed and payload. Improved payload capability can arise from gains in aerodynamic efficiency in hover via reduction of tip stall and in forward flight via reduction in retreating blade stall. Similar boundary layer problems attend other aerodynamic surfaces, such as fuselages, compressor and turbine blades, wings, and so forth.

Fluid flow in the boundary layer adjacent to a surface exhibits a reduction in velocity due to friction of the molecular viscosity interacting with the surface, which results in a strong velocity gradient as a function of perpendicular distance from the wall:

essentially zero at the surface, raising to mainstream velocity at the outer edge of the boundary layer. The reduced velocity results in a lower momentum flux, which is the product of the density of the fluid times the square of its velocity. Along a diverging surface (that is, a surface that tails away from the mean flow direction), as is the case on the suction surface (the upper surface) of a wing or a helicopter rotor blade, the flow along the surface is accompanied by a pressure rise, which is accomplished only by conversion of momentum flux. The momentum and energy of the fluid along the surface is consumed in overcoming the pressure rise and friction so that the fluid particles are finally brought to rest and the flow begins to break away from the wall, resulting in boundary layer separation. Boundary layer separation typically results in the termination of pressure rise (recovery) and hence loss in performance (e.g., airfoil lift) and dramatic decrease in system efficiency, due to conversion of flow energy into turbulence, and eventually into heat. It is known that boundary layer separation can be deterred by increasing the momentum flux of the fluid particles flowing near the surface. In the art, the deterrence or elimination of boundary layer separation is typically referred to as "delaying the onset of boundary layer separation".

The simplest and most common method for overcoming boundary layer separation includes small vortex generators, which may typically be tabs extending outwardly from the surface (such as the upper surface of an airplane wing), which shed an array of streamwise vortices along the surface. The vortices transport the low momentum particles near the surface away from the surface, and transports the higher momentum particles flowing at a distance from the surface toward the surface, thereby improving the momentum flux of particles flowing near the surface in the boundary layer. This has the effect of deterring boundary layer separation at any given velocity and angle of attack. However, as is known, tab-type vortex generators create parasitic drag which limits the degree of boundary layer separation that can be efficiently/practically suppressed.

Another known approach employs continuous flow into or out of the boundary layer. A wall suction upstream of the boundary separation line (that is the line at which the onset of full boundary layer separation occurs across the surface of an airfoil or a diffuser) simply removes low momentum flux fluid particles from the flow adjacent to the surface, the void created thereby being filled by higher momentum flux particles drawn in from the flow further out from the surface. A similar approach is simply blowing high energy fluid tangentially in the downstream direction through a slot to directly energize the flow adjacent to the surface. Both of these flow techniques, however, require a source of vacuum or a source of pressure and internal piping from the source to the orifices at the surface. These techniques introduce cyclic vortical disturbances into the boundary layer which are amplified in the unstable shear layer into large vortical structures that convect momentum toward the surface; the separation is thereby limited to an extent, but the boundary layer is far from attached. This greatly increases the cost, weight and complexity of any such systems which have not as yet been found to be sufficiently effective to justify use.

A relatively recent, so-called "dynamic separation control" uses perturbations oscillating near the surface, just ahead of the separation point, as are illustrated in U.S. Pat. No. 5,209,438. These include: pivotal flaps which oscillate from being flush with the surface to having a downstream edge thereof extending out from the surface; ribbons parallel to the surface, the mean position of which is oscillated between being within the surface and extending outwardly into the flow; perpendicular obstructions that oscillate in and out of the flow; and rotating vanes (microturbines) that provide periodic obstruction to the flow, and oscillatory blowing. These devices introduce a periodic disturbance in vorticity to the flow, the vortices being amplified in the unstable separating shear layer into large, spanwise vortical structures which convect high momentum flow toward the surface, thereby enabling pressure recovery. Such a flow is neither attached nor separated, under traditional definitions. However, such perturbations must be actively controlled as a function of all of the flow and geometric parameters, dynamically, requiring expensive modeling of complex unsteady flow structures and/or significant testing to provide information for adapting to flow changes either through open loop scheduling or in response to feedback from sensors in the flow.

A recent variation on the dynamic separation control is the utilization of a so-called "synthetic jet" (also referred to as "acoustic jet" or "streaming") directed perpendicular to the surface upstream of the boundary separation line of the surface. This approach has been reported as being highly parameter dependent, thus also requiring dynamic control; and, the results achieved to date have not been sufficient to merit the cost and complexity thereof.

DISCLOSURE OF INVENTION

Objects of the invention include improved boundary layer flow; improved aerodynamic performance of structures including airfoils, fuselages, blades, and so forth; improved deterrence of boundary layer separation, increased efficiency and lift of wings and helicopter rotor blades; improved aircraft stability; boundary layer control which is effective, efficient, having low initial cost and zero operating costs, and boundary layer control which is relatively simple and provides no parasitic impact on the host structures and systems.

This invention is predicated in part on the fact that the outflowing jet stream of an acoustic jet will clear the orifice or nozzle area sufficiently before the onset of negative pressure, which therefore will cause replenishment of fluid mass within the jet cavity with molecules which are other than those in the emitted jet stream. This invention is also predicated in part on the discovery that a synthetic jet directed tangentially into a boundary layer of a fluid flow will produce a net negative flow averaged over time which is generally perpendicular to the surface and a net positive flow averaged over time which is generally parallel to the surface.

According to the present invention, an acoustic jet directed into the boundary layer of fluid flow (such as air) along the surface of a vibrating structure having an aerodynamic profile, to control the boundary layer thereof, is powered by a resiliently supported mass forming one wall of an acoustic chamber, oscillations of the mass as a result of vibration of the structure causing commensurate air pressure variations to drive the acoustic jet. The jet may preferably be oriented at a low angle of incidence with respect to the surface so that pulses of fluid particles are injected substantially tangentially into the boundary layer. In one application of the invention, the acoustic jet is directed at a low angle of incidence in the vicinity of the boundary layer separation point of an aerodynamic profile, thereby to deter or prevent boundary layer separation.

The negative pressure portion of the acoustic jet cycle creates a flow of low momentum flux fluid particles perpendicular to the surface, entering the chamber, thereby removing low momentum flux fluid particles from the approaching boundary layer. The energized fluid particles, having higher momentum flux, injected preferably essentially tangentially into the boundary layer, provide adequate momentum flux in the boundary layer to deter the onset of boundary layer separation downstream thereof. Use of the vibration energy can result in a smoother, quieter system.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a perspective view of a helicopter employing the invention.

FIG. 2 is a sectioned, side elevation view of a helicopter blade employing a simple embodiment of the present invention, taken on the line 2—2 of FIG. 1.

FIG. 3 is a sectioned, side elevation view of a helicopter blade employing a two-chamber, two-nozzle embodiment of the present invention.

FIG. 4 is a partial, front sectional view of a two-chamber, two-slot embodiment of the invention, with the slots separated spanwise, taken on the line 4—4 of FIG. 5.

FIG. 5 is a sectioned, side elevation view of an aerodynamic structure employing two-chambers and two spanwise slots, taken on the line 5—5 in FIG. 4.

FIG. 6 is a partially sectioned, side elevation view of a rocket powered vehicle employing a two-chamber, multi-streamwise slot embodiment of the invention.

FIG. 7 is a top plan view of the vehicle of FIG. 6.

FIG. 9 is a fanciful, schematic illustration of the arrangement of the invention applied to the blade of FIG. 8 as viewed from the suction side of the blade.

FIG. 10 is a fanciful, schematic illustration of the arrangement of the invention looking through sections of the blade toward the blade tip.

FIG. 11 is a fanciful, schematic illustration of the arrangement of the invention viewed from the leading edge of the blade.

BEST MODE FOR CARRYING OUT THE INVENTION

Figure 8:
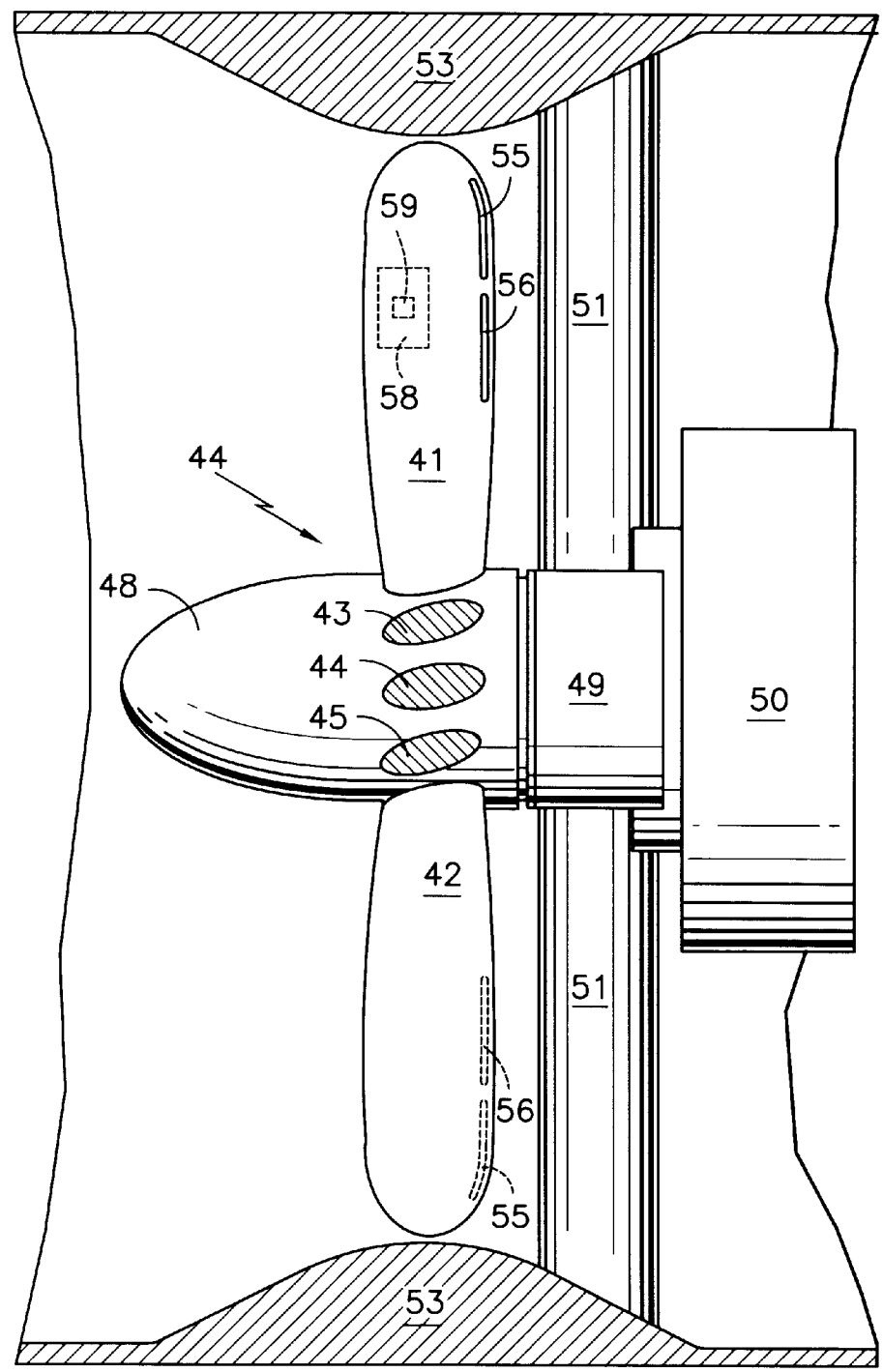
FIG. 8 is a simplified, partially sectioned, side elevation view of an air handler fan, illustrating the slots, membrane and mass of the present invention.

Referring to FIGS. 1 and 2, an airfoil 9, which may comprise the blades of the main rotor 10 of a helicopter 11 have a hollow core 13 which is separated into two chambers 14, 15 by a resilient membrane 16 which has a mass 17 disposed thereon. A nozzle 20 connects the chamber 14 with the suction surface 22 of the blade so as to form a vibration-powered acoustic jet. The nozzle 20 is preferably oriented at a small acute angle with respect to the suction surface 22, so that air particles will be injected substantially tangentially into the boundary layer on the suction surface 22, thereby to deter or prevent boundary layer separation. The jet is powered by motion of the mass 17 acting on the flexible membrane 16 in an oscillatory fashion, which is induced by vibration which naturally occurs with the blade 9 when the helicopter is operating. The mass 17 and membrane 16, along with the chambers 14, 15, can be dimensioned in a fashion to produce large air pressure oscillations at low frequencies, for example 40 Hertz to several hundred Hertz. In accordance with the invention, the jet effect on the boundary layer is not frequency dependent, other than to maximize mass flow through the nozzle. Other frequencies may be used to suit any particular implementation of the present invention. The mass 17 may be a separate piece affixed to the membrane in any suitable fashion as shown in FIG. 2 or it may be formed as an integral part of the membrane 16, as shown in FIG. 4. The membrane 16 may preferably be formed of a suitable polymer, or a metal, in dependence upon the design parameters of any utilization of the invention. The hollow core 13 is typically surrounded by a casing 26 and the remainder of the blade may be formed up of honeycomb material 27 with a fiber composite shell 28, all as is conventional. In FIG. 2, other features of helicopter blades which are conventional have been omitted for clarity. As seen in FIG. 1, the nozzles 20 may be elongated, and there may be several nozzles disposed along substantially the entire length of each blade, each nozzle or group of nozzles being driven by one or more acoustic jets.

Although not shown in FIG. 2, the chamber 15 may require a vent. On the other hand, the chamber 15 may also be used for providing mass flow through a slot, as illustrated in FIG. 3. Therein, as the mass 17 and membrane 16a oscillate back and forth, a forward pressure wave is formed in the chamber 14 and a complementary backwave is formed in the chamber 15. The chamber 14 is provided with a slot-shaped nozzle 30 and the chamber 15 is provided with a slot-shaped nozzle 31, which is downstream of the nozzle 30 on the suction surface 22. This essentially doubles the efficiency, and in the configuration of FIG. 3, will generally allow the boundary layer to be held very tightly to the surface 22.

Another form of the invention which utilizes both the positive pressure and the negative pressure of the vibrating membrane is illustrated in FIGS. 4 and 5. Therein, a pair of wall structures 32, 33 support a combined mass and membrane 34 that will produce a positive pressure in a chamber 35 which drives a slot-shaped nozzle 37 and a negative pressure in a chamber 36 which evacuates a slot-shaped nozzle 38 which is separated spanwise (cross-stream) from the nozzle 37; the mass/membrane 34 will alternately provide a negative pressure in the chamber 35 and a positive pressure in the chamber 36. Of course, each chamber of an acoustic jet could drive a plurality of nozzles, the nozzles being separated streamwise and/or spanwise from other nozzles driven by the same chamber, as well as other nozzles driven by other chambers, in any configuration within the scope of the invention.

FIGS. 6 and 7 illustrate the invention applied to the fuselage of an aerodynamic vehicle 40, which may comprise a rocket powered vehicle, or otherwise.

Referring to FIG. 8, an air handler fan 44, which may be a vane-axial fan, has a plurality of blades 41–45, the blades 43–45 being shown sectioned for clarity. The blades 41–45 are secured to a hub 48 which is driven through a journal 49 by a motor 50 which is mounted to vanes 51 that also support the journal 49. The vanes 51 are disposed within an interplenum shroud 53. In this example, rotation of the fan is such that blades at the top of the page retreat from the viewer while blades at the bottom of the page advance toward the viewer. Therefore, the view of blade 41 is of the suction surface and the view of blade 42 is of the pressure surface. Each of the blades have at least a pair of slots 55, 56 which comprise the nozzles for a two chamber acoustic jet having a membrane 58 and a mass 59, which is shown in more detail in FIGS. 9–11. Therein, one side of the membrane 58 has an acoustic jet chamber 61 with a channel 62 leading to the slot 55, and the other side of the membrane 58 has an acoustic jet chamber 64 and a channel 65 leading to the slot 56. In FIGS. 9–11, the dotted lines indicate the edge of the chamber 64 and channel 65, and the dashed lines indicate the edge of the chamber 61 and channel 62. As is known, each blade of the fan creates a vortex which provides aerodynamic interaction with the following blade, which causes variations in blade drag and variations in lift (that is, useful work). These variations are manifested in vibratory blade flap at a substantially constant frequency, which provides a source of energy to cause vibration of the mass 59, thereby to operate the acoustic jet. This results in creating an essentially steady, streamline flow on the blade in the region downstream of the slots, with the boundary layer of the flow adjacent the blade attached to the blade surface, which significantly increases the efficiency of the fan.

Figure 13:
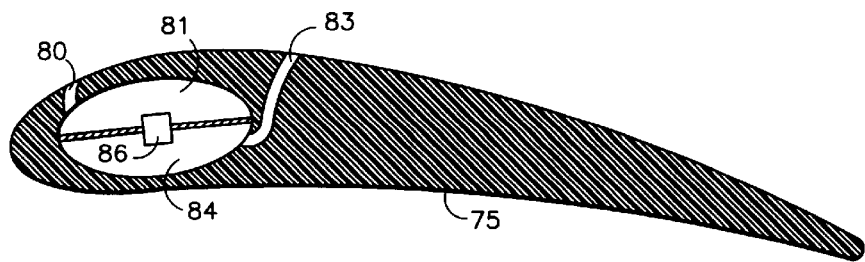
FIG. 13 is a section taken on the line 13—13 in FIG. 12.
Figure 12:
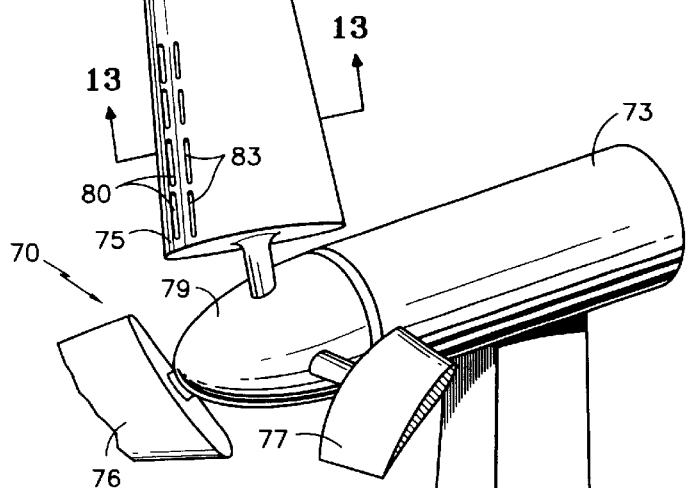
FIG. 12 is a partially broken away perspective view of a wind energy electric power generator employing the invention.

Referring to FIGS. 12 and 13, a wind energy electric power generator 70 includes a structure 71 supporting a generator 73 driven by blades 75–77 mounted on a hub 79. A plurality of leading slots 80 each comprise the nozzle of an acoustic jet having a chamber 81, and a plurality of trailing slots 83 each comprise the nozzle of an acoustic jet having a chamber 84, both chambers driven by the same mass/membrane resonant system 86. If desired in any case, the resonant system 86 could be mounted to oscillate in a direction other than normal to the cord of the blade as shown, such as parallel to the cord of the blade, or otherwise.

Although described with respect to blades and fuselages, the invention, a vibration powered, mechanically resonant synthetic jet for control of boundary layers, may be practiced in other structures with a surface having an aerodynamic profile, or in other applications with other fluids where there is a boundary layer problem and sufficient mechanical vibratory energy to power the synthetic jet. For instance, the aerodynamic surfaces illustrated herein may be fuselages, helicopter blades, wings, blades of air moving machinery, blades of wind energy electric power generators, or support struts within a fluid flow, etc.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A structure which vibrates when in operation, comprising:
    a surface forming a part of said structure and having an aerodynamic profile;
    a resilient membrane having a concentrated mass disposed thereon;
    a chamber disposed within said structure, said membrane forming a flexible wall of said chamber, said chamber being located adjacent to a boundary layer separation point of said surface; and
    a nozzle connecting said chamber with said surface in the vicinity of said boundary layer separation point, vibration of said structure when in operation causing said mass to oscillate at frequencies related to the frequencies of vibration of said structure, thereby producing oscillatory pressure variations in said chamber at frequencies related to the frequencies of vibration of said mass which in turn provides pulses of fluid particles into the boundary layer of said surface at frequencies related to the frequencies of vibration of said structure.

2. A structure according to claim 1 wherein said structure is an airfoil.

3. A structure according to claim 1 wherein said structure is a blade.

4. A blade according to claim 3 wherein said blade is part of a helicopter rotor.

5. A blade according to claim 3 wherein said blade is part of an air handler.

6. A blade according to claim 3 wherein said blade is part of a wind energy electric power generator.

7. A structure according to claim 1 wherein said structure is a fuselage.

8. A structure according to claim 1 wherein said mass and said membrane comprises two separate pieces joined together.

9. A structure according to claim 1 wherein said mass is integrally formed with said membrane.

10. A structure according to claim 9 wherein said mass is encapsulated within said membrane.

11. A structure according to claim 1 wherein said membrane is formed of polymer.

12. A structure according to claim 1 wherein said membrane is formed of metal.

13. A structure according to claim 1 wherein said mass is formed of metal.

14. A structure according to claim 1 wherein said nozzle is oriented at a small acute angle with respect to said surface whereby said pulses of fluid particles are injected substantially tangentially into said boundary layer.

15. A structure according to claim 1, comprising:
   a second chamber disposed within said structure, said membrane forming a flexible wall of said second chamber, said second chamber being located adjacent to said surface; and
   a second nozzle connecting said second chamber with said surface, whereby vibration of said structure when in operation produces oscillatory pressure variations in said second chamber which in turn provides pulses of fluid particles into the boundary layer of said surface.

16. A structure according to claim 15 wherein said second nozzle is separated streamwise from said first nozzle.

17. A structure according to claim 16 wherein said second nozzle is disposed downstream of said first nozzle.

18. A structure according to claim 15 wherein said second nozzle is separated cross-stream from said first nozzle.

19. A structure having a surface with an aerodynamic profile;
   said structure, when operating in at least one regime of its intended use, vibrating consistently with modes of vibration including one mode vibrating within a band of frequencies containing a significant fraction of the vibrational energy of said modes of vibration;
   said surface, when said structure is operating in said at least one regime, having fluid flow adjacent said surface subject to boundary layer separation;
   said structure having a chamber disposed adjacent to a boundary layer separation point of said surface, one wall of said chamber comprising a resilient membrane having a concentrated mass disposed thereon and capable of oscillating at a frequency excitable by said band of frequencies in response to said vibration; and
   a nozzle connecting said chamber with said surface, vibration of said structure when operating in said at least one regime causing said mass to oscillate at frequencies related to said band of frequencies, thereby producing oscillatory pressure variations in said chamber at frequencies related to said band of frequencies which in turn provides pulses of fluid particles into the boundary layer of said surface at frequencies related to said band of frequencies.

20. A structure according to claim 19 wherein said nozzle connects said chamber with said surface in the vicinity of a boundary layer separation point of said fluid flow.

21. A structure according to claim 19 wherein said structure is an airfoil.

22. A structure according to claim 19 wherein said structure is a blade.

23. A structure according to claim 22 wherein said blade is part of a helicopter rotor.

24. A structure according to claim 22 wherein said blade is part of an air handler.

25. A structure according to claim 22 wherein said blade is part of a wind energy electric power generator.

26. A structure according to claim 19 wherein said structure is a fuselage.

27. A structure according to claim 19 wherein said mass and said membrane comprises two separate pieces joined together.

28. A structure according to claim 19 wherein said mass is integrally formed with said membrane.

29. A structure according to claim 28 wherein said mass is encapsulated within said membrane.

30. A structure according to claim 19 wherein said membrane is formed of polymer.

31. A structure according to claim 19 wherein said membrane is formed of metal.

32. A structure according to claim 19 wherein said mass is formed of metal.

33. A structure according to claim 19 wherein said nozzle is oriented at a small acute angle with respect to said surface whereby said pulses of fluid particles are injected substantially tangentially into said boundary layer.

34. A structure according to claim 19, comprising:
   a second chamber disposed within said structure, said membrane forming a flexible wall of said second chamber, said second chamber being located adjacent to said surface; and
   a second nozzle connecting said second chamber with said surface, whereby vibration of said structure when operating in said at least one regime produces oscillatory pressure variations in said second chamber which in turn provides pulses of fluid particles into the boundary layer of said surface.

35. A structure according to claim 34 wherein said second nozzle is separated streamwise from said first nozzle.

36. A structure according to claim 35 wherein said second nozzle is disposed downstream of said first nozzle.

37. A structure according to claim 34 wherein said second nozzle is separated cross-stream from said first nozzle.

* * * * *